S. MLOTKOWSKI.
SIGHTING DEVICE.
APPLICATION FILED AUG. 21, 1917.
1,283,540.
Patented Nov. 5, 1918.
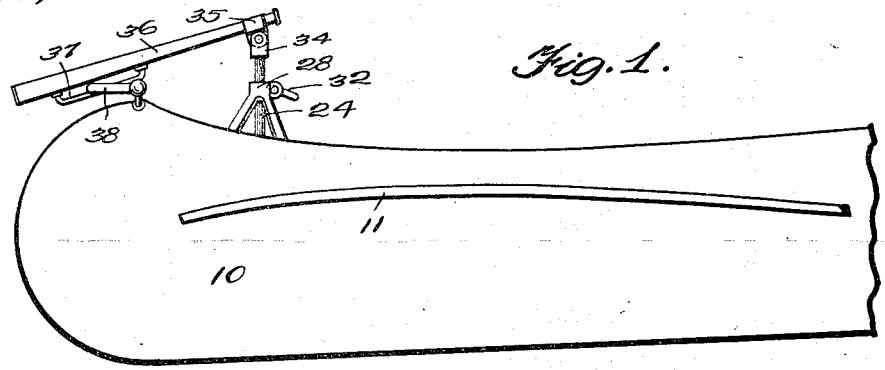
Fig. 1.
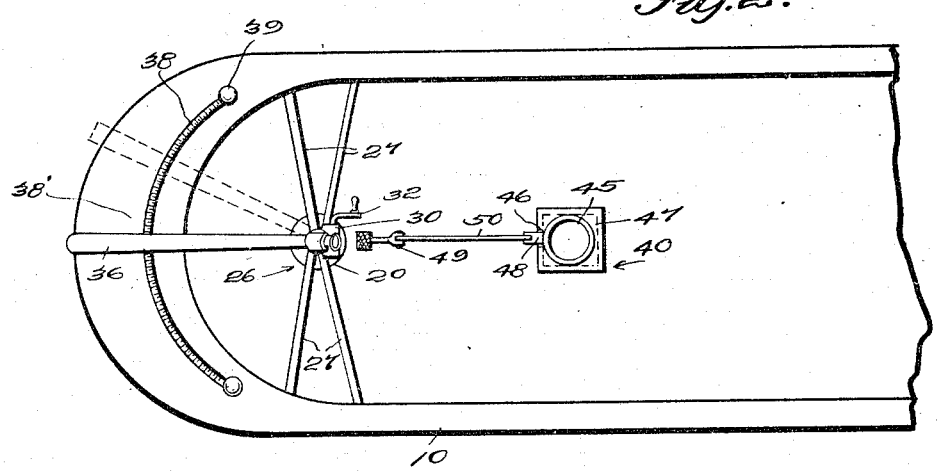
Fig. 2.
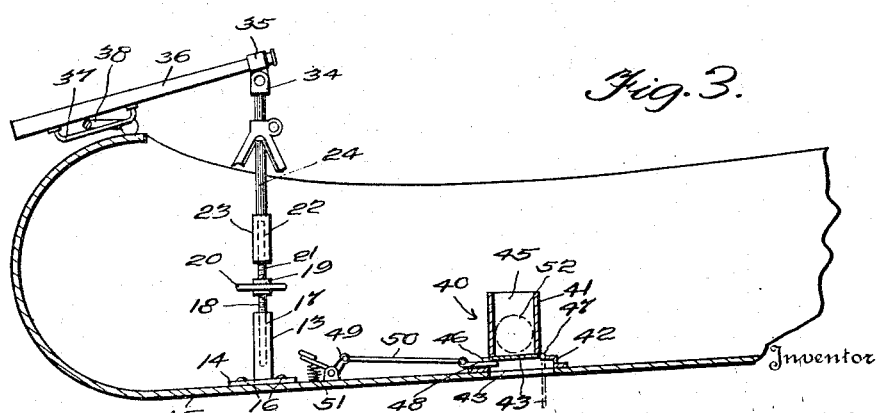
Fig. 3.
Fig. 4.
Inventor
Stasch Mlotkowski,
By Norman T. Whitaker
his Attorney
Witness
J. N. Lyles

UNITED STATES PATENT OFFICE.

STASCH MLOTKOWSKI, OF LOS ANGELES, CALIFORNIA.

SIGHTING DEVICE.

1,283,540.   Specification of Letters Patent.   Patented Nov. 5, 1918.

Application filed August 21, 1917. Serial No. 187,471.

*To all whom it may concern:*

Be it known that I, STASCH MLOTKOWSKI, a citizen of the United States, and a resident of Los Angeles, in the county of Los Angeles and State of California, have invented new and useful Improvements in Sighting Devices, of which the following is a specification.

This invention relates to sighting devices and has particular reference to that class of sighting devices used in connection with flying machines.

An important object of the invention is to provide a means carried by an airplane for sighting an object sought to be attacked, regardless of the direction of flight of the airplane with respect to the object or the height at which the airplane is operating.

A further object of the invention is to provide a means carried by an airplane for sighting an object which is capable of varying the vertical angle of sight as the airplane rises or descends, in its course of flight, or approaches the object sought to be attacked.

A further object of the invention is to provide a means carried by an airplane for sighting an object and for indicating the existing angular relation of the course of travel of the airplane with the line of sight of the object sighted.

A further object of the invention is to provide a means carried by an airplane for sighting an object and for indicating the airplane in its course of travel toward the object sighted.

A further object of the invention is to provide a means for sighting an object capable of varying the angle formed between the line of flight of the airplane and the line of sight of the object.

A further object of the device is to provide a device of the above mentioned character which is simple in construction, reliable and accurate in its operation, and convenient and effective in use.

Other objects of the invention will be apparent during the course of the following description.

In the accompanying drawings, forming a part of this specification and in which like numerals are employed to designate like parts throughout the same, Figure 1 is a side elevation of a portion of an airplane embodying the invention, Fig. 2 is a top plan view of the same, Fig. 3 is a central vertical longitudinal sectional view of Fig. 1, and Fig. 4 is a detailed view of a worm having engagement with a ribbed shaft.

In the drawings wherein for the purpose of illustration is shown a preferred form of the invention, numeral 10 designates a body portion of an airplane, one plane or wing of which is indicated by the numeral 11.

Within the body portion 10 and at a point relatively near the forward end thereof is located a vertically adjustable support designated as a whole by the numeral 12. This support comprises a pedestal or base 13 having formed at its lower end a flange 14 secured to the bottom of the body portion 10 by means of bolts 16 or the like as shown. The pedestal 13 is provided with a centrally longitudinally disposed screw thread opening 17, adapted to receive therein a screw threaded stem 18 depending from the lower end of a hub 19 of a hand wheel 20, the screw threads of the stem 18 engaging the screw threads of the opening 17. The upper end of the hub 19 is provided with a screw threaded stem 21 in axial alinement with the depending stem 18 as shown and is adapted to enter a central longitudinal screw threaded opening 22 of an elongated sleeve 23 secured to the lower end of an elongated upwardly extending longitudinally ribbed shaft 24, the screw threads of the stem engaging the screw threads of the opening 22. The ribs 25 are arranged longitudinally with respect to the shaft 24 and extend throughout the length of the same.

The shaft 24 is braced to prevent any undesired movement of the same by means of a bracket designated as a whole by the numeral 26, and comprising a plurality of downwardly extending legs 27 secured to a collar or journal 28 at the upper ends thereof. These legs are secured at the lower ends thereof to the interior of the body portion 10 by any suitable means.

The collar or journal 28 is provided with a central opening 29 sufficiently large to permit the shaft 24 to rotate therein. To one side of the collar 28 is secured a housing 30 having confined therein a worm 31 adapted to engage the longitudinal ribs 25 of the shaft 24 as clearly shown in Fig. 4. The worm is actuated by means of a crank 32 mounted on the end of the shaft 33 which carries the worm 31.

The upper end of the shaft 24 is provided with a cap 34 which serves as a member of a joint to which is pivotally secured a collar 35. This collar 35 is adapted to encircle an end of a telescope 36, as shown in Fig. 3. The telescope 36 is provided with a guide member 37 mounted on the lower side thereof. This guide member 37 is adapted to receive a rail 38 of substantially arcuate shape secured at each end to upright members 39 disposed upon the front end of the body portion 10, as shown.

The operation of the device is as follows:

Assuming that an airship provided with my device in in flight and it is desired to direct a bomb 52 or other explosive carried within the tubular section 41 upon an object. The object sought to be attacked with a bomb or other explosive is located by means of the telescope 36 which is capable of being adjusted either vertically or horizontally in order to direct one's line of sight from the eye through the telescope upon the object. When the operator has located an object, sought to be attacked, through the telescope 36, assuming it to maintain a position with respect to the railing 38, as indicated by the dotted lines in Fig. 2, the angle between the line of sight and the line of flight is indicated by graduations 38' upon the rail 38, thereby indicating to the pilot of the airship to what degree the course of travel must be changed in order to pass directly over the object sought to be attacked. The pilot of the airship upon reading the angle of deviation as indicated by the graduations 38' will change his course of flight to such a direction as to bring the line of sight in parallel alinement with the sides of the airship whereupon the telescope will be moved as the airship changes its course of travel, keeping the object always in focus, to a central position with respect to the rail 38, as shown in Fig. 2. After having thus directed the airship in its line of travel as to cause it to pass directly over the object sought to be attacked, such direction will be maintained throughout the course of travel, should the object be kept always in focus and the telescope positioned centrally with respect to the rail 38, as shown in Fig. 2. As the object is approached, in order to always keep it in focus, a vertical adjustment of the supporting member is necessary.

This adjustment is made possible by means of the hand wheel 20 which when turned in a clockwise direction is designed to elevate the end of the telescope 36 which is secured to the shaft 24, thereby bringing the line of sight more nearly into a perpendicular position as the object is approached.

When the object sought to be attacked has been sufficiently approached as to make possible the directing of the bomb thereupon the foot lever 49 is depressed, thereby releasing the catch 48 from engagement with the trap door 43 allowing it to swing through the opening 44 whereupon the bomb 52 or other explosive will be released from the tubular section 41 upon the object sought to be attacked.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. The combination with an airship of a sighting device comprising a vertically adjustable support, a telescope having one end pivoted thereto, a guide arm, the other end of said telescope, and a rail on the airship confined between said guide and telescope.

2. The combination with an airship of a sighting device comprising a support, a telescope having one end pivotally connected thereto, a railing for supporting the other end of said telescope, and means for laterally moving one end of said telescope throughout the length of said rail.

3. The combination with an airship of a sighting device comprising a pedestal, a shaft provided with a plurality of longitudinally disposed ribs, a sleeve provided at one end of said shaft, and a hand wheel disposed between said pedestal and sleeve, said wheel being provided with a hub having a stem secured to each end thereof one of said stems being adapted to engage said pedestal the other of said stems being adapted to engage said sleeve.

STASCH MLOTKOWSKI.

Copies of this patent may be obtained for five cents each, by addressing the "Commissioner of Patents, Washington, D. C."